United States Patent

Baresel et al.

[11] Patent Number: 5,387,475
[45] Date of Patent: Feb. 7, 1995

[54] CATALYTIC COATING FOR COOKING SURFACES

[75] Inventors: Detlef Baresel, Stuttgart; Peter Scharner, Leonberg; Helmut Janku, Traunreut, all of Germany

[73] Assignees: Bosch-Siemens Hausgeraete GmbH, Munich; Robert Bosch GmbH, Stuttgart, both of Germany

[21] Appl. No.: 862,534

[22] PCT Filed: Dec. 13, 1990

[86] PCT No.: PCT/EP90/02172

§ 371 Date: Aug. 20, 1992

§ 102(e) Date: Aug. 20, 1992

[30] Foreign Application Priority Data

Dec. 21, 1989 [DE] Germany .............. 3942236

[51] Int. Cl.$^6$ ............ B32B 9/00; B32B 33/00; B01J 21/00
[52] U.S. Cl. ........................ 428/689; 106/286.1; 106/286.4; 106/286.5; 428/433; 428/450; 428/457; 428/469; 428/471; 428/698; 428/699; 502/177; 502/200; 502/202; 502/204; 502/240; 502/242; 502/246; 502/254
[58] Field of Search ........... 106/286.5, 286.1, 286.4, 106/286.8; 502/240, 241, 242, 243, 246, 258, 260, 177, 200, 202, 204, 254; 428/450, 457, 469, 471, 688, 689, 698, 433

[56] References Cited

U.S. PATENT DOCUMENTS

| | | | |
|---|---|---|---|
| 2,495,837 | 1/1950 | Porter | 428/433 |
| 3,113,200 | 12/1963 | Hurko | 219/409 |
| 3,460,523 | 8/1969 | Stiles et al. | 126/19 R |
| 3,547,098 | 12/1970 | Lee | 126/19 R |
| 3,576,667 | 4/1971 | Lee | 427/376.4 |
| 3,598,650 | 8/1971 | Lee | 126/19 R |
| 3,718,498 | 2/1973 | Denny et al. | 126/19 R |
| 4,007,251 | 2/1977 | Isaksson et al. | 264/332 |
| 4,282,195 | 8/1981 | Hoekje | 423/289 |
| 4,515,862 | 5/1985 | Maki et al. | 428/450 |

FOREIGN PATENT DOCUMENTS

| | | |
|---|---|---|
| 2123235 | 11/1971 | Germany . |
| 1197067 | 7/1970 | United Kingdom . |
| 1197069 | 7/1970 | United Kingdom . |

Primary Examiner—Anthony Green
Attorney, Agent, or Firm—Kane, Dalsimer, Sullivan, Kurucz, Levy, Eisele and Richard

[57] ABSTRACT

The invention relates to catalytic coating compositions for surfaces of cookers, ovens, fryers or grills, to a process for the preparation of these coating compositions, and to cookers, ovens, fryers or grills or parts thereof having surfaces provided with the coating compositions according to the invention.

2 Claims, No Drawings

CATALYTIC COATING FOR COOKING SURFACES

BRIEF DESCRIPTION OF RELATED ART

Self-cleaning cookers, ovens, fryers or grills have already been proposed; cf. for example DE-C-2 517 526, DE-B-1 817 529 and ETZ-B, 25 (1973) M 171–172.

However, the effect of the known catalytically self-cleaning enamel is in need of improvement at temperatures below 300° C. Instead of complete degradation of organic substances, visually unattractive, coated surfaces are formed, or residual substances are stored in the pores, evaporate out on re-warming and precipitate on cooler parts, for example on viewing windows.

There is therefore a desire for greater catalytic effectiveness and increased service life of catalytically coated surfaces of cookers, ovens, fryers or grills or parts thereof, with cleaning at temperatures of about 250° C. with as little residue as possible being particularly desired.

SUMMARY OF THE INVENTION

One object of the invention is achieved, in accordance with an embodiment, by a catalytic coating composition for surfaces of cookers, ovens, fryers or grills which contains oxides of at least one metal from the group consisting of cerium, sodium, potassium, calcium, manganese, nickel and cobalt.

According to a further embodiment of the invention, a catalytic coating composition for surfaces of cookers, ovens, fryers or grills is proposed which contains highly porous silicates with at least one metal from the group consisting of cerium, sodium, potassium and calcium, and if desired one or more other silicates.

Here and in the embodiment below, these optional silicates may be inorganic compounds of silicon with aluminum and/or phosphorus, for example aluminum silicates, or silicon aluminum phosphates, such as SiAlPO$_3$.

According to a further embodiment of the invention, a catalytic coating composition for surfaces of cookers, ovens, fryers or grills is proposed which contains highly porous aluminates with at least one metal from the group consisting of cerium, sodium, potassium and calcium, and if desired one or more silicates.

DETAILED DESCRIPTION OF THE INVENTION

According to a specific embodiment of the invention, a catalytic coating composition for surfaces of cookers, ovens, fryers or grills is proposed which, in addition to the highly porous silicates and at least one metal from the group consisting of cerium, sodium, potassium and calcium or the highly porous aluminates and at least one metal from the group consisting of cerium, sodium, potassium and calcium, contains an oxide or oxides of at least one metal from the group consisting of manganese, nickel and cobalt (i.e. said metals in oxidic form and not as silicate or aluminate).

According to a further specific embodiment of the invention, the above mentioned catalytic coating compositions may additionally contain an alkali metal compound and/or alkaline earth metal compound with tantalum oxide, niobium oxide and/or tin dioxide.

Said compounds have high Coulomb field strengths between cation and anion and increase the catalytic activity in the regions close to the surface, these compounds also being able to undergo sintering with the enamel surface at elevated temperatures without decomposition. The surface area is thus increased, since said compounds do not form chemical compounds with the enamel base substance at the temperatures used.

According to a further embodiment of the invention, a catalytic coating composition for surfaces of cookers, ovens, fryers or grills is proposed which contains at least one boride, carbide, silicide and/or nitride of at least one metal from the fourth, fifth and/or sixth subgroup of the Periodic Table.

The catalytic coating compositions according to the invention may be powders.

A further object of the invention is achieved by a process for the preparation of one of the above-described catalytic coating compositions containing sodium, potassium, calcium, manganese, nickel and/or cobalt, in which said metals are precipitated from aqueous solutions of their salts (a) if desired in the presence of a dissolved or dispersed silicate of said metals or dissolved or dispersed silicic acid and/or (b) if desired in the presence of a dissolved or dispersed aluminate of said metals or a dissolved or dispersed aluminum oxide, dried and powdered, and if desired mixed with highly porous silicate and/or base enamel.

Finally, a further object of the invention is achieved in accordance with an embodiment by cookers, ovens, fryers or grills or parts thereof having surfaces obtainable by (a) coating the untreated or base-enameled surfaces with a coating composition according to the invention (containing base enamel powder) and sintering or melting the coating composition onto the surfaces, or (b) coating base-enameled surfaces, after baking, with a coating composition according to the invention (containing no base enamel powder) and sintering or fusing the coating onto the base enamel.

Finally, a further embodiment of the invention relates to cookers, ovens, fryers or grills or parts thereof having surfaces obtainable by coating the base-enameled surfaces with a coating composition containing at least one boride, carbide, silicide and/or nitride of at least one metal from the fourth, fifth and/or sixth subgroup of the Periodic Table and sintering the coating composition onto the surface in air. This procedure presumably results in the boron or silicon component, during its oxidation, being anchored to the substrate via oxygen bonds in its nascent condition, while the carbon or nitrogen component escapes as a gaseous compound.

In order to test the self-cleaning quality, the currently valid DIN test 51171 with soya oil was employed. In this test, the known catalytically coated metal sheets undergo 5 cycles before becoming coated (no further self-cleaning). By contrast, up to 14 cycles can be achieved using metal sheets coated according to the invention.

In gravimetric tests, an improvement in the order of 30% is achieved for soya oil degradation at 250° C.

The invention is described in greater detail below by means of examples.

EXAMPLE 1

Nominal composition: 65.3% of $CeO_2$, 29.4% of MnO, 3.35% of CoO and 1.95% of NiO.

13 g of cerium nitrate, 31 g of manganese nitrate, 3.4 g of cobalt nitrate and 2.0 g of nickel nitrate were dissolved in about 300 ml of water and precipitated at elevated temperature (about 80° to 90° C.) using a solution of 14 g of sodium hydroxide in about 200 ml of water. The precipitate was then cooled, filtered off and dried at from 120° to 250° C., and then reslurried in water, boiled, washed, dried at 120° C. and conditioned at 600° C. for 2 hours.

5 g of the resultant catalyst powder were mixed with 5 g of the commercial catalytic LC base enamel powder, mixed with water to give a paste, applied to a base-enameled metal sheet and sintered at 700° C. for 10 minutes. A firmly adherent, porous, black coating was obtained onto which it was possible to drip soya oil 12 times in accordance with the DIN 51171 test without a shine being formed. The thermogravimetric degradation rates of soya oil on pure catalyst powder were 62.9% at a heating rate of 10° C./min up to 250° C. and 99.0% up to 360° C. See also Table 1.

EXAMPLE 2

Nominal composition: 87% of zeolite, 4.2% of $CeO_2$, 7.7% of MnO, 0.8% of CoO and 0.3% of NiO 17.4 g of zeolite 4A (Fluka), 2.12 g of cerium nitrate, 6.23 g of manganese nitrate, 0.62 g of cobalt nitrate and 0.23 g of nickel nitrate were suspended or dissolved in 300 ml of water, and 100 ml of 3% strength hydrogen peroxide were added. Precipitation was effected by dropwise addition of a concentrated ammonia solution at elevated temperature at a pH in the range from 8 to 9. After addition of 5 g of diammonium carbonate, the mixture was concentrated to 100 ml at elevated temperature, and filtered, and the product was dried at 150° C. and conditioned at 500° C. for 2 hours. The catalytic properties of the resultant product are shown in Table 1.

TABLE 1:

Thermogravimetric degradation rates (TGA) of soya oil
(The mixtures of novel and commercial powders were conditioned at 700° C. for 15 minutes and 1 hour respectively).

| Sample | Degradation (%) | | | |
|---|---|---|---|---|
| | 1 h/ 250° C. | 5 h/ 250° C. | 10 min/ 350° C. | 1 h/ 350° C. |
| Commercial enamel I | 19.0 | 29.1 | 37.1 | 67.6 |
| Commercial enamel II | 24.6 | 37.4 | 36.7 | 74.4 |
| Catalyst from Example 1 + commercial enamel I (75% by weight) | 25.2 | 44.0 | 41.5 | 68.1 |
| Catalyst from Example 2 + commercial enamel II (75% by weight) | 34.6 | 48.5 | 49.8 | 98.4 |
| $MoSi_2$ + commercial enamel II (50% by weight) | 47.5 | — | — | 86.6 |

EXAMPLE 3

Molybdenum disilicide having a particle size of less than 50 μm was sprayed onto an uncoated metal sheet in a plasma arc at a current strength of 600 A (53 V) at a spray distance of 120 mm under an argon/hydrogen mixture (6:1) for 1 minute. The feed rate was about 22 g/min and the molybdenum disilicide coating thickness was about 300 μm. A thermogravimetric degradation rate of 45% after 1 hour at 250° C. and 66% after 5 hours were obtained for the percentage degradation of soya oil.

EXAMPLE 4

4.8 g of cerium nitrate, 12.0 g of manganese nitrate, 1.2 g of cobalt nitrate and 0.4 g of nickel nitrate were jointly dissolved in 300 ml of water, and 55 ml of undilute commercial water glass solution (Merck; about 30 to 35% $Na_2SiO_3$ content) were added dropwise. At the end point, the solution solidified in a gel-like manner. The gel was reliquefied using 200 ml of water, and 30 ml of 10% hydrogen peroxide solution were added to oxidise manganese II. The mixture was then briefly heated to the boil and subsequently centrifuged. Subsequent drying at about 120° C., slurrying and washing with water, drying at about 120° C. and calcining at 600° C. for about 1 hour gave a highly porous doped silicate.

EXAMPLE 5

20 g of a commercial enamel powder (II) were mixed with 20 g of molybdenum disilicide having a particle size of less than 50 μm, the mixture was stirred with water to give a paste, the paste was applied to a base-enameled metal sheet and the coating was sintered at 690° C. for 10 minutes. The thermogravimetric degradation of the soya oil on this firmly adherent, porous, black coating was 47.5% after 1 hour at 250° C. and 86.6% after 1 hour at 350° C.; cf. Table 1.

TABLE 2

Quantitative composition of catalytic enamels

| | Major components [>10% by weight] | Secondary components [1–10%] | | Minor components [1–0.1%] |
|---|---|---|---|---|
| Enamel I | 74.9% of $SiO_2$ | 6.4% of $Fe_2O_3$ | | 0.69% of $Li_2O$ |
| | 11.0% of $Al_2O_3$ | 2.0% of MnO | | 0.19% of CaO |
| Enamel II | 34.7% of $SiO_2$ | 8.0% of MnO | 3% of $Na_2O$ | 0.35% of $K_2O$ |
| | 23.5% of $TiO_2$ | 6.0% of $Al_2O_3$ | 1% of MgO | 0.30% of $Li_2O$ |
| | 16.1% of $Fe_2O_3$ | 5.0% of CaO | | |

TABLE 3

| | Degradation [%] | | | |
|---|---|---|---|---|
| | 250° C. | | 350° C. | |
| | 1 h | 5 h | 10 min | 1 h |
| Components of enamel I as described in U.S. Pat. No. 4,515,862, Table 1 | | | | |
| $Li_2SiO_3$ | | | | |
| CaO | | | | |
| $CaSiO_3$ | | | | |
| $CaAl_2O_2$ | | | | |
| $Fe_2O_3$ | | | | |
| $MnO_2$ | | | | |
| $SiO_2$ | | | | |
| $Al_2O_3$ | | | | |
| Enamel I | 19.0 | 29.1 | 37.1 | 67.6 |
| Example 1 (differing, inter alia, through $CeO_2$) | 25.2 | 44.0 | 41.5 | 68.1 |
| Components of enamel II as described in U.S. Pat. No. 4,515,862 Table I | | | | |
| $Li_2SiO_3$ | | | | |
| $Na_2O$ | | | | |
| $K_2O$ | | | | |
| $KAlO_2$ | | | | |
| MgO | | | | |
| $MgSiO_3$ | | | | |
| CaO | | | | |

TABLE 3-continued

| | Degradation [%] | | | |
|---|---|---|---|---|
| | 250° C. | | 350° C. | |
| | 1 h | 5 h | 10 min | 1 h |
| CaSiO$_3$ | | | | |
| CaAl$_2$O$_4$ | | | | |
| Fe$_2$O$_3$ | | | | |
| MnO | | | | |
| TiO$_2$ | | | | |
| SiO$_2$ | | | | |
| Al$_2$O$_3$ | | | | |
| Enamel II | 24.6 | 37.4 | 36.7 | 74.4 |
| Example 2 (differing, inter alia, through CeO$_2$) | 34.6 | 48.5 | 49.8 | 98.4 |
| Example 5 (differing, inter alia, through MoSi$_2$) | 47.5 | — | — | 86.6 |

We claim:

1. An article having a cooking surface coated with a catalyst coating which is a sintered composition which comprises in admixture a base enamel and a compound selected from the group consisting of a boride, carbide, silicide or nitride of a metal selected from the group consisting of metals of the fourth, fifth or sixth subgroup of the periodic table.

2. The article of claim 1, wherein the admixture further comprises 0.3 to 29.4 percent by weight of the total admixture of an oxide of a metal selected from the group consisting of oxides of manganese, nickel and cobalt.

* * * * *

UNITED STATES PATENT AND TRADEMARK OFFICE
CERTIFICATE OF CORRECTION

PATENT NO. : 5,387,475
DATED : February 7, 1995
INVENTOR(S) : Detlef Baresel, Peter Scharner and Helmut Janku It is certified that error appears in the above-indentified patent and that said Letters Patent is hereby corrected as shown below:

Col. 1, under the Title insert

-- BACKGROUND OF THE INVENTION

Field of the Invention

This invention relates to a catalytic coating composition, process for its preparation, and cookers, ovens, fryers or grills or parts obtainable using the coating composition. --

Signed and Sealed this

Thirteenth Day of June, 1995

Attest:

BRUCE LEHMAN

Attesting Officer     Commissioner of Patents and Trademarks